(12) United States Patent
Debras et al.

(10) Patent No.: US 6,252,017 B1
(45) Date of Patent: Jun. 26, 2001

(54) PRODUCTION OF POLYETHYLENE HAVING IMPROVED CRACK AND/OR IMPACT RESISTANCE

(75) Inventors: Guy Debras, Frasnes-les-Gosselies; Hugo Vandaele, Bruges, both of (BE)

(73) Assignee: Fina Research, S.A., Feluy (BE)

( * ) Notice: Subject to any disclaimer, the term of this patent is extended or adjusted under 35 U.S.C. 154(b) by 0 days.

(21) Appl. No.: 09/161,607

(22) Filed: Sep. 26, 1998

(30) Foreign Application Priority Data

Sep. 27, 1997 (EP) .................................................. 97202973
Jun. 24, 1998 (EP) .................................................. 98111644

(51) Int. Cl.⁷ .................................. C08F 2/01; C08F 4/22
(52) U.S. Cl. .................................. 526/65; 526/68; 526/69; 526/106; 526/73; 526/160; 526/943; 526/348.6
(58) Field of Search .................................. 526/65, 66, 68, 526/69, 70, 160, 943, 348.6, 73, 106, 348.5

(56) References Cited

U.S. PATENT DOCUMENTS 5,478,898 * 12/1995 Standert et al. ........................ 526/65

FOREIGN PATENT DOCUMENTS

50698/96 * 11/1996 (AU) .

* cited by examiner

Primary Examiner—David W. Wu
Assistant Examiner—R. Harlan
(74) Attorney, Agent, or Firm—Jim D. Wheelington

(57) ABSTRACT

A process for producing polyethylene having improved crack resistance, the process comprising copolymerizing ethylene and an alpha-olefinic comonomer comprising from 3 to 8 carbon atoms, in the presence of a chromium-based catalyst in a first reactor, feeding the polyethylene copolymer thereby produced and the chromium-based catalyst to a second reactor, and in the second reactor copolymerizing ethylene and an alpha-olefinic comonomer comprising from 3 to 8 carbon atoms, in the presence of the chromium-based catalyst thereby to produce a second polyethylene product, the first and second polyethylene products forming a combined polyethylene having a monomodal molecular weight distribution.

26 Claims, 7 Drawing Sheets

PRODUCTION OF POLYETHYLENE HAVING IMPROVED CRACK AND/OR IMPACT RESISTANCE

BACKGROUND TO THE INVENTION

The present invention relates to a process for producing polyethylene having improved crack and/or impact resistance.

DESCRIPTION OF THE PRIOR ART

Polyethylene is known for use in the manufacture of a wide variety of articles. The polyethylene polymerisation process can be varied in a number of respects to product a wide variety of resultant polyethylene resins having different physical properties which render the various resins suitable for use in different applications. In particular, it is known to use polyethylene for use in applications where the polyethylene is required to have crack resistance, both resistance to rapid and to slow crack growth. For example, polyethylene is known for use in the manufacture of pipes where it is required that the material of the pipe has sufficient crack resistance so as to avoid inadvertent fracture in service. It is also known to use medium density polyethylene for the manufacture of films where the polyethylene is required to have impact resistance.

Chromium-based catalysts used for the production of polyethylene have been known for some time. Typically, for the manufacture of polyethylene use as a pipe resin, the polyethylene is polymerised in a reactor using a chromium-based catalyst to product a monomodal molecular weight distribution of the resultant polyethylene resin.

It is known in the art that the physical properties, in particular the mechanical properties, of a polyethylene product can vary depending on what catalytic system was employed to make the polyethylene. This is because different catalyst systems tend to yield different molecular weight distributions in the polyethylene produced.

SUMMARY OF THE INVENTION

The present invention aims in one aspect to provide a process for producing polyethylene, in particular a polyethylene having a monomodal molecular weight distribution, having improved crack and/or impact resistance.

Accordingly, the present invention provides a process for producing polyethylene having improved crack and/or impact resistance, the process comprising copolymerising ethylene and an alpha-olefinic comonomer comprising from 3 to 8 carbon atoms, in the presence of a chromium-based catalyst in a first reactor, feeding the polyethylene copolymer thereby produced and the chromium-based catalyst to a second reactor, and in the second reactor copolymerising ethylene and an alpha-olefinic comonomer comprising from 3 to 8 carbon atoms, in the presence of the chromium-based catalyst thereby to produce a second polyethylene product, the first and second polyethylene products forming a combined polyethylene having a monomodal molecular weight distribution.

Preferably, a greater amount of comonomer is incorporated into the second polyethylene product than in the first polyethylene product.

Preferably, the combined polyethylene comprises from 50 to 70% by weight of the first polyethylene product and from 30 to 50% by weight of the second polyethylene product.

To achieve such a monomodal molecular weight distribution, the first and second polyethylene products individually have substantially the same molecular weight distribution and melt index.

The present inventor has discovered surprisingly that by producing a polyethylene pipe resin having a monomodal distribution using two reactors in series, as opposed to using a single reactor, the resultant pipe resin exhibits better resistance to slow crack growth and to rapid crack propagation.

The present inventor has further discovered surprisingly that by producing a medium density polyethylene resin (MDPE) having a monomodal distribution using two reactors in series, the resultant resin can be used to produce films having improved impact resistance and/or also tear strength.

BRIEF DESCRIPTION OF THE DRAWINGS

Embodiments of the present invention will now be described by way of example only with reference to the accompanying drawings, in which.

DETAILED DESCRIPTION OF THE PREFERRED EMBODIMENTS

Figure 1:
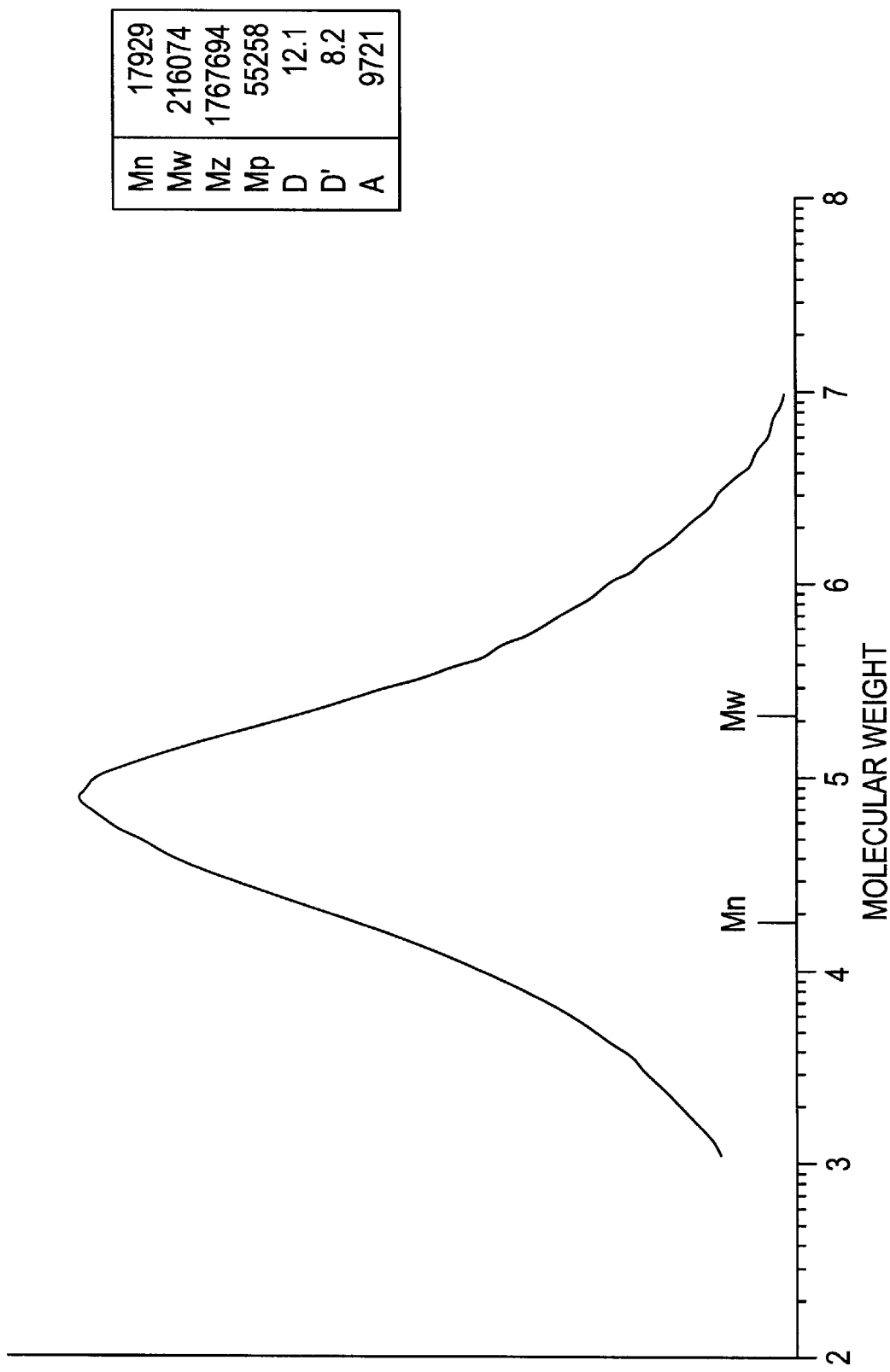
FIG. 1 is a gel permeation chromatograph of a monomodal polyethylene resin produced in accordance with the invention.

In accordance with the invention, a monomodal polyethylene resin is produced in two serially connected reactors, each reactor incorporating a common chromium-based catalyst. Preferably the chromium-based catalyst comprises a supported chromium oxide catalyst having a titania-containing support, for example a composite silica and titania support. A particularly preferred chromium-based catalyst may comprise from 0.5 to 5 wt % chromium, preferably around 1 wt % chromium, such as 0.9 wt % chromium based on the weight of the chromium-containing catalyst. The support comprises at least 2 wt % titanium, preferably around 2 to 3 wt % titanium, more preferably around 2.3 wt % titanium based on the weight of the chromium containing catalyst. The chromium-based catalyst may have a specific surface area of from 200 to 700 m$^2$/g, preferably from 400 to 550 m$^2$/g and a volume porosity of greater than 2 cc/g preferably from 2 to 3 cc/g.

A particularly preferred chromium-based catalyst ("Catalyst 1") for use in the present invention comprises a catalyst which has an average pore radius of 190A, a pore volume of around 2.1 cc/g, a specific surface area of around 510 m$^2$/g and a chromium content of around 0.9 wt % based on the weight of the chromium-containing catalyst. The support comprises a composite silica and titania support. The amount of titania in the support provides that the catalyst as a whole comprises around 2.3 wt % titanium.

The catalyst may be subjected to an initial activation step in air at an elevated activation temperature. The activation temperature preferably ranges from 500 to 850° C., more preferably 600 to 750° C.

In order to enhance the degree of comonomer incorporation into the polyethylene resin (thereby to lower the density of the resin), the catalyst preferably has a high surface area, greater than 400 m²/g, and has been fluorinated prior to activation, so as to have a fluorine content of around 1 wt %.

In the first reactor, preferably ethylene monomer and an alpha-olefinic comonomer comprising from 3 to 8 carbon atoms are fed thereinto in the liquid phase, typically in an inert diluent, preferably isobutane, together with a chromium-based catalyst. Typically, the copolymerisation is performed at a temperature of from 90 to 105° C., more typically around 100° C., and at a pressure of from 20 to 60 bars, more typically around 42 bars. The comonomer preferably comprises 1-hexene, but may alternatively comprise 1-butene, 1-pentene, 4-methyl 1-pentene, 1-heptene or 1-octene.

Typically, the ethylene monomer comprises from 3 to 8% by weight and the comonomer comprises from 0.2 to 4% by weight, each based on the total weight of the monomer and comonomer in the inert diluent. A typical starting composition comprises an ethylene flow of around 6.2 wt %, a 1-hexene flow of around 0.7 wt % in isobutane as inert diluent with the hexene/ethylene weight ratio being around 0.117.

In the first reactor, polyethylene is produced by copolymerisation of the ethylene and the 1-hexene. In accordance with the preferred process, in the first reactor the process variables such as the ethylene flow rate and the temperature are controlled so as to produce a polyethylene resin having a specified high load melt index (HLMI) yielding the required mechanical properties of the resin. Typically, the HLMI ranges from 5 to 30 g/10 min, and is most typically from 8 to 23 g/10 min. The high load melt index is determined using the procedures of ASTM D1238 using a load of 21.6 kg at a temperature of 190° C. The HLMI is broadly inversely indicative of the molecular weight of the polymer. In other words, a low melt index is indicative of a high molecular weight for the polyethylene, and vice versa. In the first reactor, the density of the resultant polyethylene is controlled by varying the amount of comonomer fed to the first reactor.

The polyethylene product, together with unreacted ethylene and hexene in the inert diluent, is fed to the second reactor serially connected thereto and also additional monomer (ethylene) and comonomer are fed into the second reactor. The same chromium-based catalyst is present in the second reactor as in the first reactor. In the second reactor, the process parameters are varied to produce therein a second polyethylene product whereby the second polyethylene product, and thus the final combined polyethylene product, have substantially the same HLMI, and optionally substantially the same density, as the first polyethylene product produced in the first reactor so that the combined polyethylene product has a monomodal molecular weight distribution.

Preferably, the HLMI of the second polyethylene product is with ±15% of the HLMI of the first polyethylene product.

In one arrangement, the first and second polyethylene products have substantially the same density. More preferably, the second polyethylene product has a density within 0.001 g/cc of the density of the first polyethylene product.

In another arrangement, the first and second polyethylene produces have differing densities, e.g. differing by up to about 0.020 g/cc, typically around 0.008 g/cc. The first polyethylene product may have a density of from 0.930 to 0.934 g/cc and the second polyethylene product may have a density of from 0.942 to 0.946 g/cc, particularly when the final polyethylene resin consists of substantially equal portions by weight of the first and second polyethylene products.

As is known in the art, a monomodal molecular weight distribution has a single peak in the gel permeation chromatography curve of the resin. As is also known in the art, when two resins are combined to form a composite resin having a monomodal molecular weight distribution, the HLMI values of the two resins tend to be the same or reasonably similar, depending on the actual HLMI values themselves. Thus for example preferred resins made in accordance with the invention may have HLMI values of each resin ranging from 5 to 30 g/10 min, with the final resin product having an HLMI ranging from 8 to 23 g/10 min. More particularly, the HLMI may range from 15 to 20 g/10 min. For other resins made in accordance with the invention, the HLMI values of the two resins may be higher than or lower than this range but the difference between the HLMI values is controlled so that, for any combination of resins produced in accordance with the invention, the resultant molecular weight distribution is nevertheless monomodal. The density of the two resin products produced in the first. and second reactors may differ substantially, yet still providing a monomodal molecular weight distribution in the final combined resin. Such a density difference may yield improved slow crack growth resistance and/or improved impact resistance of the combined resin. A typical density difference is around 0.02 g/cc for achieving improved crack resistance for pipe applications, and around 0.008 g/cc for improved impact resistance for a MDPE film. If there is a density difference, the higher and lower molecular weight products tend to have lower and higher density respectively.

Preferably, the density of the combined polyethylene is from 0.930 to 0.948 g/cc.

To achieve this, the weight percentages of ethylene and comonomer in the second reactor are selected. These weight percentages are achieved by controlling the amount of ethylene and comonomer additionally introduced into the second reactor over and above the residual amounts thereof passing into the second reactor from the first reactor together with the first polyethylene product.

Without being bound by theory, it is believed that the chromium-based catalyst is progressively chemically reduced by the ethylene in the first reactor to yield $Cr^{2+}$ ions in the catalyst. The chemically reduced catalyst changes how the comonomer is incorporated into the polymer chains in the first reactor. In the second serially connected reactor, the chromium-based catalyst has already been chemically reduced yielding a different degree of introduction of the comonomer into the polymer chains in the second reactor as compared to the first reactor. This leads to a change in the mechanical properties of the polyethylene resin produced in the second reactor as compared to that produced in the first reactor which in turn can yield an increase in the slow crack resistance and in the rapid crack propagation resistance of the polyethylene resin when used for the manufacture of pipes. This technical improvement is achievable even though the first and second polyethylene resins may have substantially the same HLMI, this in turn representing similar molecular weight distributions for the two resins. Surprisingly, it has been discovered that in targeting the density of the polyethylene produced in the second reactor so as to be substantially the same as that of the polyethylene produced in the first reactor, this can be achieved by increased comonomer consumption in the second reactor which in turn surprisingly yields improved mechanical properties of the combined resin as compared to resins having a similar density and HLMI values produced in a single reactor.

In the second reactor, since the chromium-based catalyst has been previously chemically reduced, significantly more comonomer is introduced into the second polyethylene resin product as compared to the amount introduced into the first polyethylene resin product. Alternatively, additional comonomer may have been introduced into the first reactor so that more comonomer is introduced into the first polyethylene resin as compared to that for the second polyethylene resin. Accordingly, the second reactor is operated by selecting a desired proportion of the combined polyethylene resin product to be constituted by the second polyethylene resin product produced in the second reactor. Typically, the second polyethylene product produced in the second reactor comprises up to 50%, more typically around one third by weight, of the composite polyethylene resin product.

The amount of additional 1-hexene fed to the second reactor may be controlled to control the density of the second polyethylene resin product. The HLMI of the second polyethylene resin product may be controlled by varying the ethylene concentration in the second reactor and the temperature in the second reactor. The proportion of the amount of polyethylene produced in the second reactor may be increased by increasing the residence time of the reactants in the second reactor.

The present invention will now be described with reference to the following non-limiting Examples.

EXAMPLE 1

Polyethylene was produced in first and second serially connected reactors in accordance with the process parameters specified in Table 1. The polymer properties of the product of the first reactor and of the final composite product exiting from the second reactor are shown in Table 1. In the first reactor, ethylene and 1-hexene were fed to the first reactor in recycled isobutane as an inert diluent and the ethylene and 1-hexene were copolymerised in the presence of the chromium-based catalyst identified as "catalyst 1" hereinabove.

The first polyethylene resin reaction product produced in the first reactor had an HLMI of 11.1 g/10 min and a density of 0.9451 g/cc. The first polyethylene resin reaction product was fed together with the 1-hexene and ethylene and the catalyst into the second reactor and additional 1-hexene was introduced into the second reactor. It may be seen from Table 1 that in the second reactor the hexene/ethylene ratio was higher than in the first reactor. The process conditions in the second reactor were controlled to yield a second polyethylene resin reaction product in the second reactor having a density substantially the same as that of the first polyethylene resin reaction product whereby as specified in Table 1, the final composite product had a density substantially the same as the product from the first reactor. It may be seen that the final polyethylene resin reaction product had a lower HLMI of 9.9 g/10 min as compared to the first polyethylene resin reaction product, this indicating a higher molecular weight, and thus a higher degree of incorporation of comonomer into the second polyethylene resin reaction product than for the first polyethylene resin reaction product. However, the HLMI values of the first and second reaction products are sufficiently close whereby the composite polyethylene resin has a monomodal molecular weight distribution. The gel permeation chromatograph of the final polyethylene product of Example 1 is shown in FIG. 1, showing such a monomodal molecular weight distribution. The residence time in the second reactor is controlled so as to be less than that in the first reactor whereby around two thirds of the total polyethylene resin production is in the first reactor and around one third of the polyethylene resin production is in the second reactor. These proportions can readily be varied depending upon the desired properties of the final polyethylene resin.

It will be seen that a significantly greater amount of C6 in the form of 1-hexene is consumed in the second reactor than in the first reactor. This demonstrates that in the second reactor a greater proportion of comonomer is introduced into the copolymer than in the first reactor.

Table 2 shows the mechanical properties of a composite polyethylene resin formed in accordance with the process conditions specified in Table 1.

The polyethylene resin was formed into a pipe and in order to test slow crack growth was subjected to a pressure test in accordance with the procedures of EN921 or ISO 1167 and a notch test in accordance with the procedures of EN33479. In each test, the pipe had a diameter of 63mm and had a ratio between the diameter and the thickness of the pipe of 11.

In the pressure test the pipe was internally pressurised at a particular temperature and at varying pressures and the number of hours to failure by rupture as a result of slow crack growth was measured. At 80° C. and a lower pressure of 5.0 MPa, the pipe failed at a significantly longer time of 3922 hours with a brittle fracture. At the same temperature of 80° C. but at a lower pressure of 4.0 MPa, the pipe failed with a brittle failure after 4706 hours in one test and in another test did not even fail even after 7850 hours.

In the notch test, the pipe was subjected to a temperature of 80° C. and a pressure of 4.0 MPa and survived the test for a period of 1010 hours.

As shown in Table 2, the polyethylene resin was also formed into a pipe having a diameter of 110 mm and a ratio between the diameter and the thickness of 11. The pipe was subjected to a rapid crack propagation (RCP) test in accordance with the RCP S4 test of ISO/DIS 13477 or EN33477. It may be seen from Table 1 that for the test at 0° C. the pipe had not failed at an internal critical pressure (Pc) of 12 bars and that when the test was repeated at a temperature of −10° C., the pipe failed by rapid crack propagation at a critical pressure Pc of 2.0 bars.

Comparative Example 1

Figure 2:
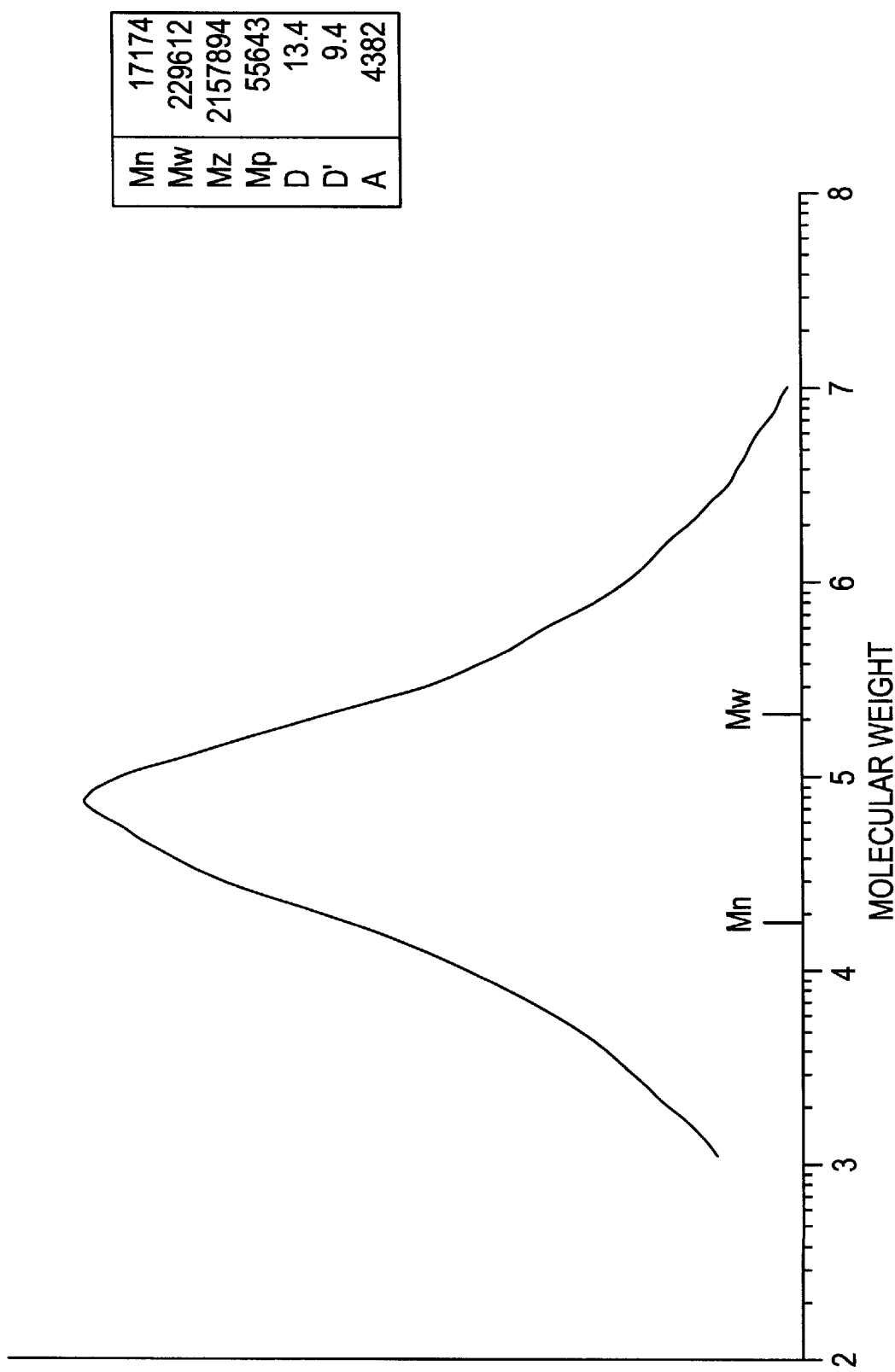
FIG. 2 is a gel permeation chromatograph of a monomodal polyethylene resin produced by a process not in accordance with the invention.

The pressure, notch and RCP tests performed on the polyethylene resin of Example 1 were repeated on a pipe formed from a polyethylene resin produced in a single reactor system, in which a monomodal polyethylene resin was produced using the same chromium-based catalyst as in Example 1 using the process conditions specified in Table 1. The polyethylene resin had a monomodal molecular weight distribution as shown in FIG. 2, which is a similar distribution to that of the resin of Example 1.

It will be seen that for the pressure tests, the pipe failed after significantly lower testing periods than for the pipe made from the polyethylene resin produced in accordance with the present invention. Moreover, for the notch test the pipe failed again after a significantly lower test period than for Example 1. This indicates an improved resistance to slow crack growth using the pipe resin polymerised using two reactors in series.

For the rapid crack propagation test, the test was carried out in Comparative Example 1 only at 0° C. and the pipe failed at a lower critical pressure Pc than Example 1 of 2.5 bars. This demonstrates that the pipe resin of the present invention can produce improved resistance of rapid crack propagation.

EXAMPLE 2

Polyethylene was produced in the first and second serially connected reactors in accordance with the process parameters specified in Table 3 yielding the polyethylene resins having the properties as also specified in Table 3. Table 3 specifies the HLMI and the density for the polyethylene product produced in the first reactor and in the final resin.

For the polyethylene product of the second reactor, this is a calculated value. It may be seen that the final resin consisted of 50% by weight of each of the products of the first and second reactors. The process parameters were controlled so as to give the same HLMI value of 15 g/10 min for the polyethylene products produced in each of reactors 1 and 2, but with a density difference of about 0.008 g/cc. The operating conditions were controlled so as to produce a low density fraction in the first reactor and a high density fraction in the second reactor. The low density fraction is achieved by employing a greater degree of comonomer incorporation in the first reactor than in the second reactor. The final resin had a HLMI of 15 g/10 min and an overall density of 0.938 g/cc making it a medium density polyethylene resin.

Figure 3:
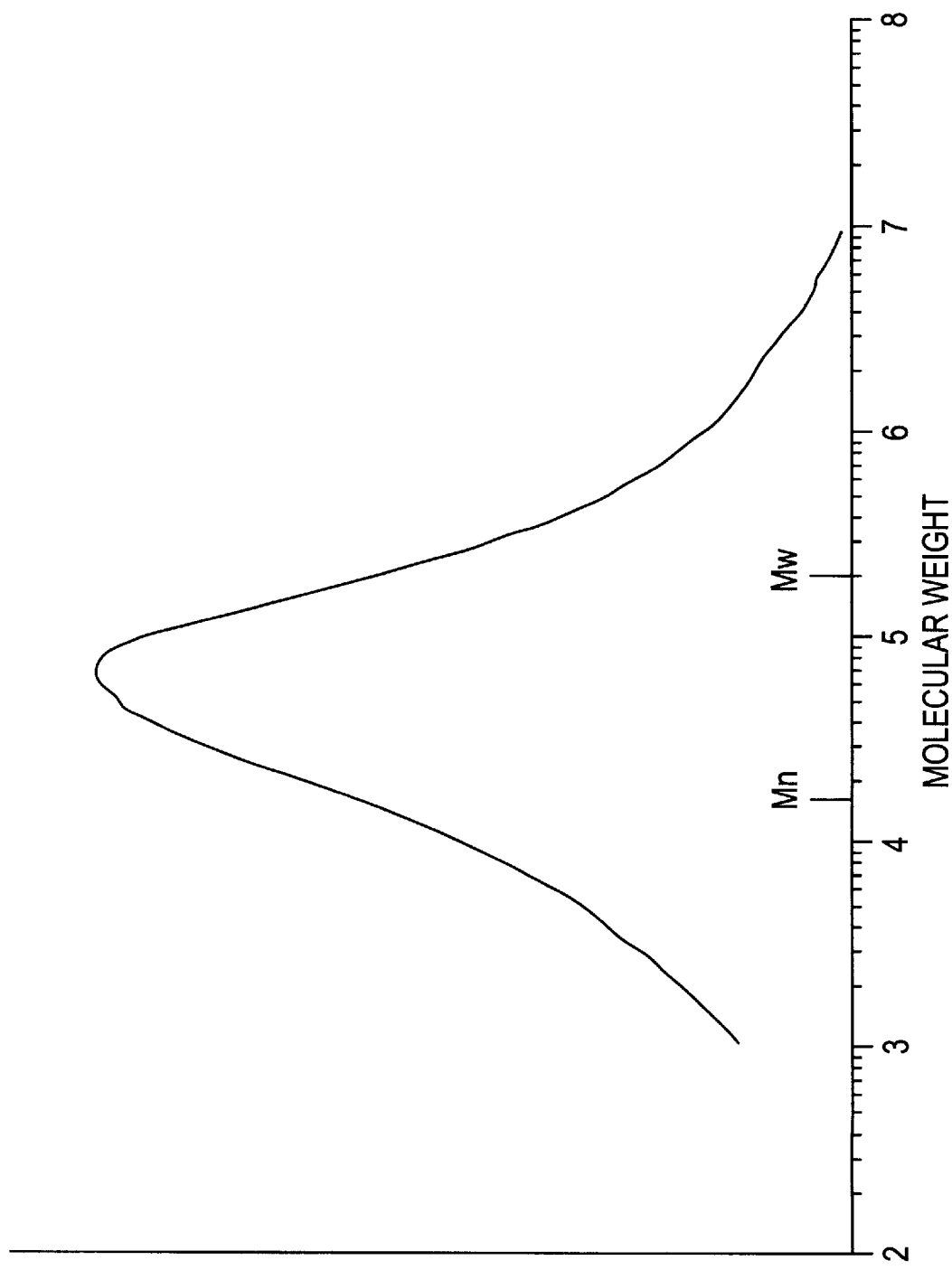
FIG. 3 is a gel permeation. chromatograph of an intermediate product from a first reactor of a pair of serially connected reactors used in an example of the invention.
Figure 4:
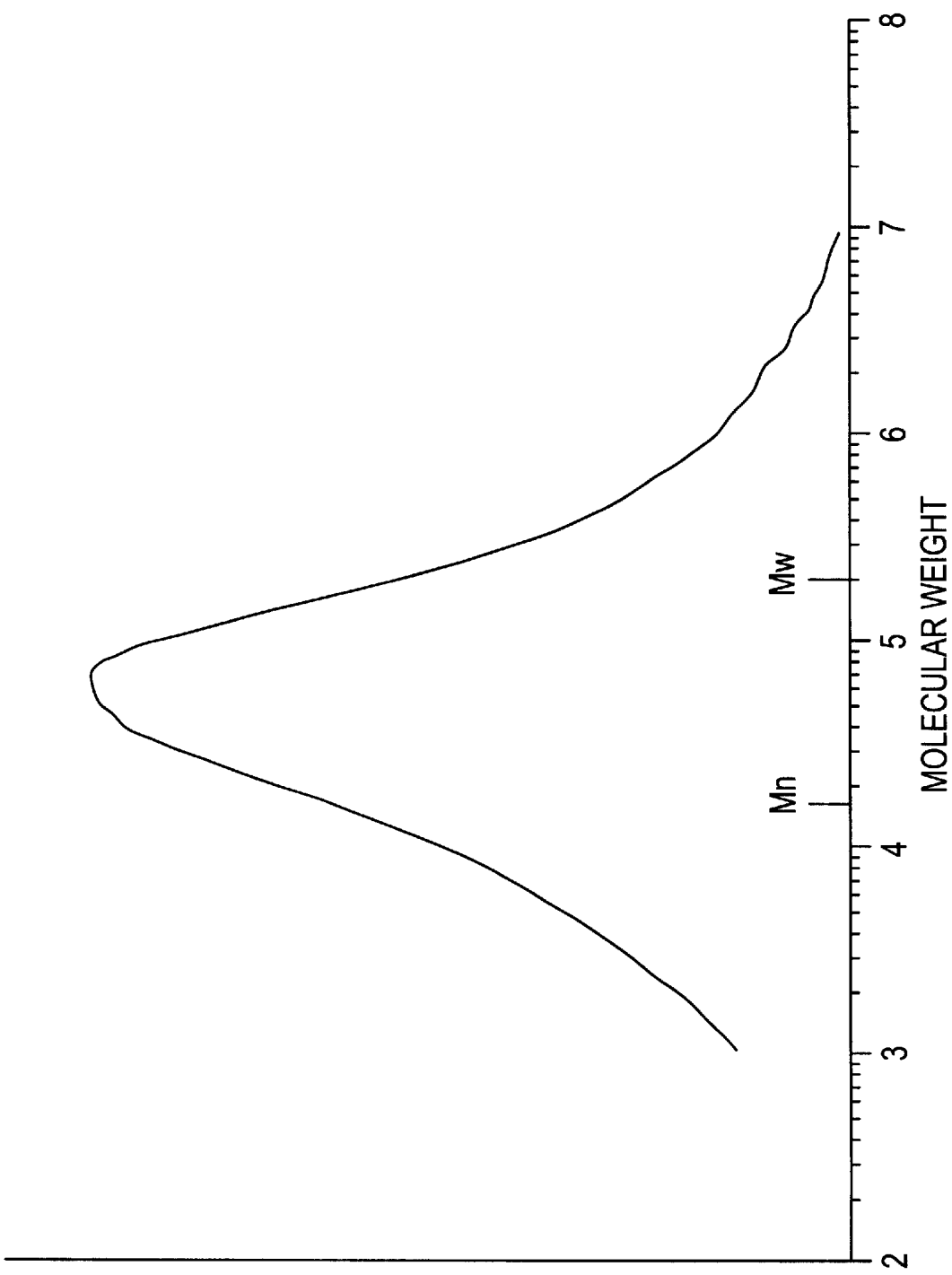
FIG. 4 is a gel permeation chromatograph of a monomodal polyethylene resin produced in accordance with the Example for FIG. 3.

Gel phase chromatographs of the intermediate product from the first reactor and of the final resin from the second reactor were obtained and the results shown in Table 3 and in FIGS. 3 and 4.

The resin was employed to produce a film having a thickness of 20 microns and a film having a thickness of 40 microns. These films were tested for the tearing resistance in the machine and transverse directions and for impact resistance by dart impact. The results are shown in Table 4.

EXAMPLE 3

Figure 5:
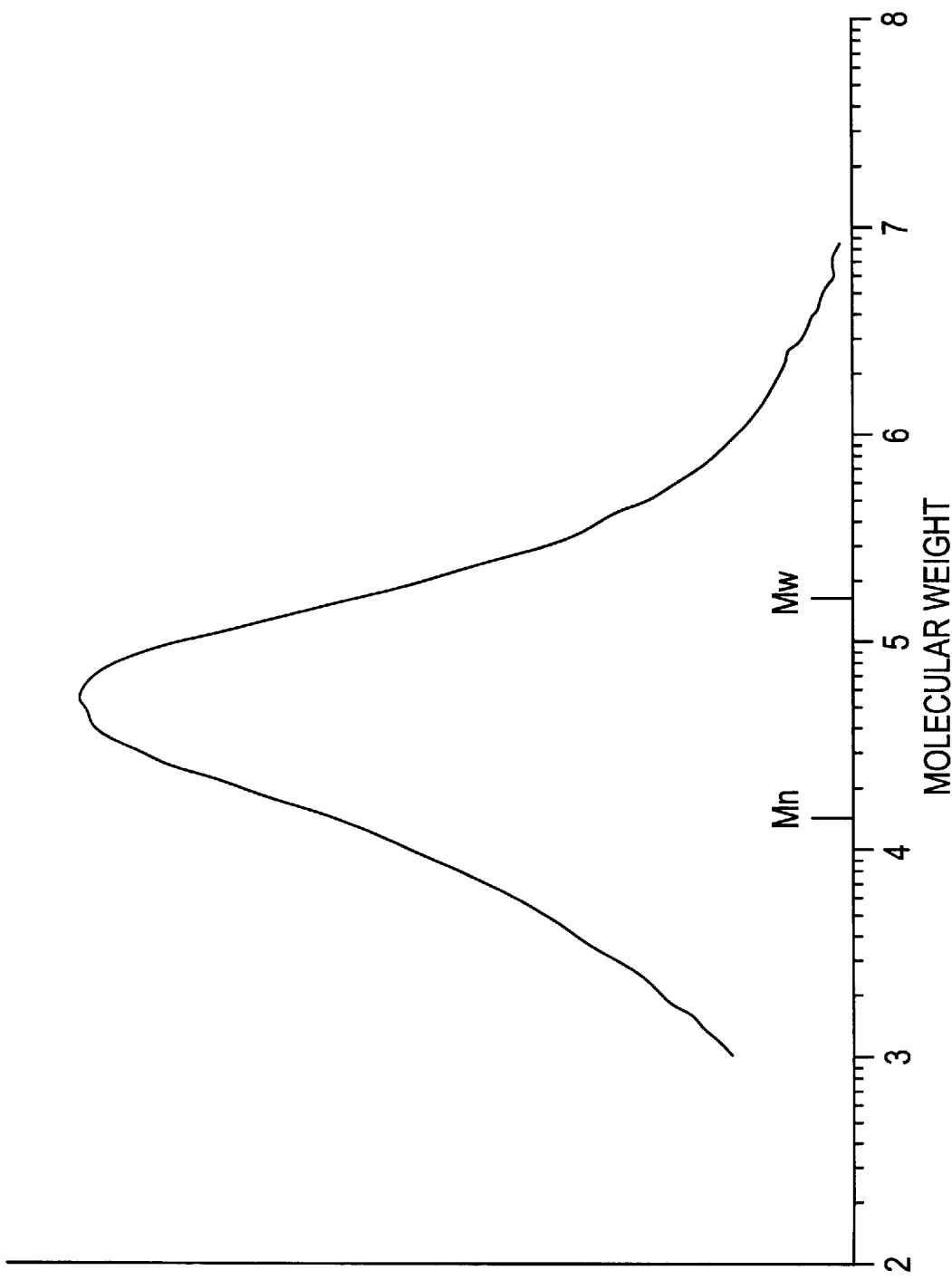
FIG. 5 is a gel permeation chromatograph of an intermediate product from a first reactor of a pair of serially connected reactors used in a further example of the invention.
Figure 6:
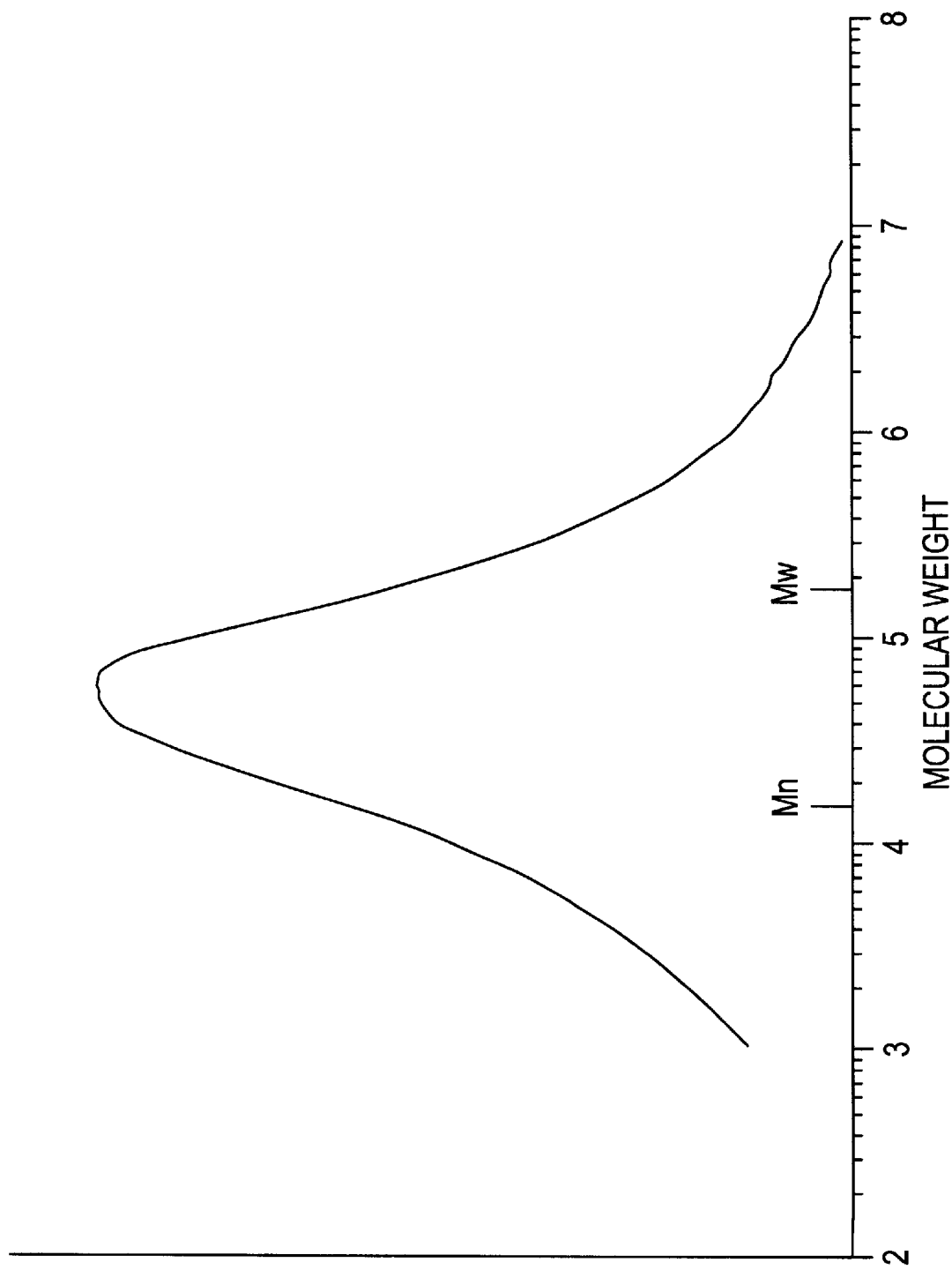
FIG. 6 is a gel permeation chromatograph of a monomodal polyethylene resin produced in accordance with the Example for FIG. 5.

Example 2 was repeated but instead the relatively high density resin fraction was produced in the first reactor and the relatively low density resin fraction was produced in the second reactor. The properties of the resins are shown in Table 3 and the properties of the films produced therefrom are shown in Table 4. It may be seen that the HLMI of the two resin fractions differed slightly, having a HLMI difference of 2 g/10 min to yield an HLMI in the final resin of 16 g/10 min. Again, the first and second resin fractions were equal in weight and the final density of the resin was 0.938 g/cc. The gel phase chromatography data, as for Example 2, are shown for Example 3 in Table 3 and the gel phase chromatograph curves are shown in FIGS. 5 and 6.

Comparative Example 2

Figure 7:
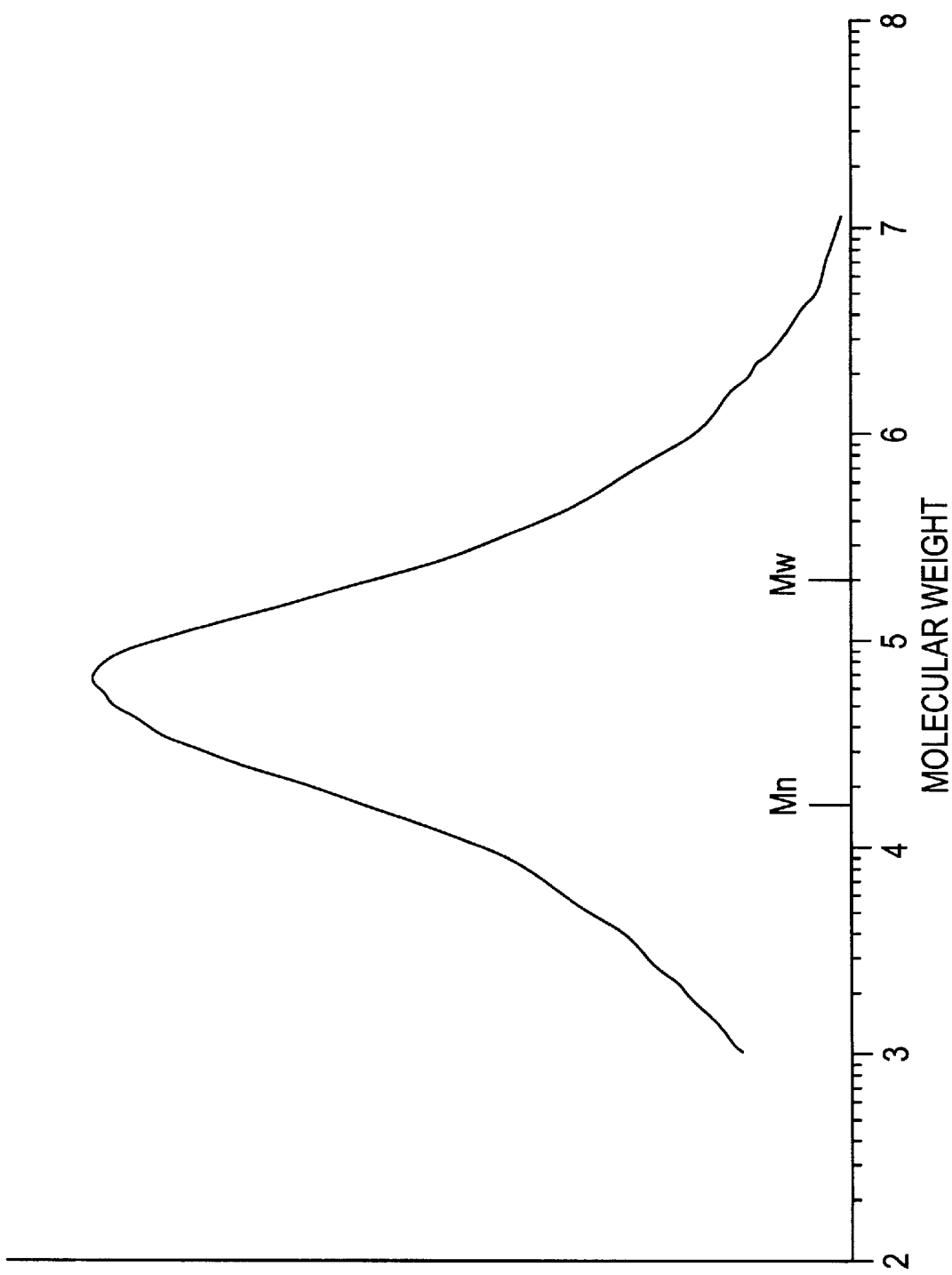
FIG. 7 is a gel permeation chromatograph of a monomodal polyethylene resin produced by a process not in accordance with the invention.

In Comparative Example 2, a monomodal polyethylene resin of medium density was produced in a single reactor system and the HLMI and density were targeted so as to be similar to the corresponding values of the resins of Examples 2 and 3. Thus for Comparative Example 2, the HLMI was 14 g/10 min and the density was 0.938 g/cc. The gel phase chromatography data is shown in Table 3 and the gel phase chromatography curve is shown in FIG. 7. The resin of Comparative Example was, as for Examples 2 and 3, made into 20 micron thick and 40 micron thick films and the films were tested for tearing resistance in the machine in transverse directions and for impact resistance using a dart. The results are shown in Table 4.

A comparison of the results of Table 4 for Examples 2 and 3 and Comparative Example 2 shows that the process of the present invention can produce medium density polyethylene resins having greatly improved dart impact resistance as compared to a resin produced in a single reactor having a similar density and melt index. Thus for a 20 micron film, a 30% improvement of the dart impact resistance was observed for Examples 2 and 3 as compared to Comparative Example 2. Moreover, for the 20 micron film, there was an increase in the tear resistance of the film in the transverse direction (TD) as compared to the corresponding property for Comparative Example 2. The tear resistance in the machine direction (MD) was substantially similar, as was the ratio between the tear strengths in the traverse and machine directions.

The gel phase chromatography (GPC) curves of the resins of the intermediate product of the first reactor, of the first resin of the second reactor (for Examples 2 and 3) and for the single step resin (of Comparative Example 2) are similar.

Thus the process of the present invention can provide a polyethylene resin which has improved mechanical properties, in particular improved impact and tear resistance for films. The polyethylene resin consists of two resin fractions of substantially the same HLMI but differing density. Since the melt indexes are substantially the same, the two resin fractions can readily be mixed to achieved a homogeneous mixture.

TABLE 1

| PRODUCTION | EXAMPLE 1 | | COMPARATIVE EXAMPLE 1 |
| --- | --- | --- | --- |
|  | First Reactor | Second Reactor | Single Reactor |
| Offgas: | | | |
| ethylene (wt %) | 6.17 | 5.78 | 5.36 |
| hexene (wt %) | 0.72 | 0.54 | 0.686 |
| $C_6/C_2$ ratio | 0.117 | 0.093 | 0.128 |
| Temperature (0° C.) | 99.4 | 100 | 99.7 |
| PE production | 66 wt % | 34 wt % | 100 wt % |
| HLMI (g/10 min) | 11.1 | 9.9 | 10.4 |
| Density (g/cc) | 0.9451 | 0.9450 | 0.9450 |
| C6-consumed (kg/metric tonne of PE) (from mass balance) | 12 | 22.5 | 15.3 |

TABLE 2

MECHANICAL PROPERTIES

| | EXAMPLE 1 | COMPARATIVE EXAMPLE 1 |
| --- | --- | --- |
| A. SLOW CRACK GROWTH | | |
| 1. PRESSURE TEST (Diam 63 mm/SDR11) | | |
| 80° C./5.0MPa (hr) | 3922 | 1020 |
| 80° C./4.0MPa (hr) | 4706 & >7850 | 2500 |
| 2. NOTCH TEST | | |
| (Diam 063 mm/SDR11) | | |
| 80° C./4.0MPa (hr) | 1010 | 350 |
| B. RAPID CRACK PROPAGATION | | |
| RCP (Diam 110 mm/SDR11) | | |
| PcS4/0° C. (bar) | >12 | 2.5 |
| PcS4/−10° C. (bar) | 2.0 | — |

TABLE 3

|  | EXAMPLE 2 | EXAMPLE 3 | COMPARATIVE EXAMPLE 2 |
|---|---|---|---|
| FIRST REACTOR Concentration | | | |
| Ethylene (wt %) | 7.9 | 7.3 | — |
| Hexene (wt %) | 5.0 | 1.6 | — |
| Temperature (° C.) | 90 | 96 | — |
| HLMI (g/10') | 15 | 17 | — |
| density (g/cc) | 0.934 | 0.942 | — |
| wt % of Final Resin | 50 | 50 | — |
| SECOND REACTOR Off gas composition | | | |
| Ethylene (wt %) | 7.2 | 7.8 | 8 |
| Hexene (wt %) | 1.8 | 4.8 | 3.1 |
| Temperature (° C.) | 94 | 92 | 93 |
| HLMI (g/10')* | 15 | 15 | — |
| density (g/cc)* | 0.942 | 0.934 | — |
| wt % of Final Resin | 50 | 50 | — |
| FINAL RESIN | | | SINGLE REACTOR |
| HLMI (g/10') | 15 | 16 | 14 |
| density (g/cc) | 0.938 | 0.938 | 0.938 |
| INTERMEDIATE PRODUCT | | | |
| Mn (kDa) | 15 | 14 | — |
| Mw (kDa) | 200 | 163 | — |
| Mz (kDa) | 1908 | 1616 | — |
| MWD | 13 | 12 | — |
| FINAL RESIN | | | |
| Mn (kDa) | 15 | 15 | 16 |
| Mw (kDa) | 180 | 171 | 210 |
| Mz (kDa) | 1765 | 1620 | 2026 |
| MWD | 12 | 12 | 13 |

*Calculated value

TABLE 4

| FILM PROPERTIES | EXAMPLE 2 | EXAMPLE 3 | COMPARATIVE EXAMPLE 2 |
|---|---|---|---|
| 20 μm | | | |
| Tear | | | |
| MD N/m$^2$ | 47 | 53 | 48 |
| TD N/m$^2$ | 127 | 131 | 104 |
| Ratio | 2.7 | 2.5 | 2.2 |
| Impact | | | |
| Dart (g) | 121 | 117 | 80 |
| 40 μm | | | |
| Tear | | | |
| MD N/m$^2$ | 55 | 69 | 60 |
| TD N/m$^2$ | 132 | 106 | 119 |
| Ratio | 2.4 | 1.5 | 2.0 |
| Impact | | | |
| Dart (g) | 126 | 113 | 105 |
| ASPECT | homogeneous | homogeneous | homogeneous |

What is claimed is:

1. A process for producing polyethylene copolymer having improved crack resistance, the process consisting essentially of copolymerizing ethylene and an alpha-olefinic comonomer comprising from 3 to 8 carbon atoms, in the presence of a chromium-based catalyst in a first reactor at a temperature of 90° C. to 105° C., feeding the first polyethylene copolymer thereby produced and the chromium-based catalyst to a second reactor, and in the second reactor copolymerizing ethylene and an alpha-olefinic comonomer comprising from 3 to 8 carbon atoms, in the presence of the chromium-based catalyst thereby to produce a second polyethylene copolymer at a temperature of 90° C. to 105° C., the first and second polyethylene copolymers forming a combined polyethylene copolymer having a monomodal molecular weight distribution.

2. A process according to claim 1 wherein a greater amount of comonomer is incorporated into the second polyethylene product than in the first polyethylene product.

3. A process according to claim 1 wherein the comonomer is 1-hexene.

4. A process according to claim 1 wherein the combined polyethylene comprises from 50 to 70% by weight of the first polyethylene product and from 30 to 50% by weight of the second polyethylene product.

5. A process according to claim 1 wherein the HLMI of the second polyethylene product is within ±15% of the HLMI of the first polyethylene product.

6. A process according to claim 5 wherein the HLMI of the first and second polyethylene products is from 8 to 23 g/10 min.

7. A process according to claim 1 wherein the first and second polyethylene products have substantially the same density.

8. A process according to claim 7 wherein the second polyethylene product has a density within 0.001 g/cc of the density of the first polyethylene product.

9. A process according to claim 1 wherein the first and second polyethylene products differ in density by up to around 0.02 g/cc.

10. A process according to claim 1 wherein the density of the combined polyethylene is from 0.930 to 0.948 g/cc.

11. A process for producing polyethylene copolymer, the process consisting essentially of copolymerizing ethylene and an alpha-olefinic comonomer comprising from 3 to 8 carbon atoms, in the presence of a chromium-based catalyst in a first reactor at a temperature of 90° C. to 105° C., feeding the first polyethylene copolymer thereby produced and the chromium-based catalyst to a second reactor, and in the second reactor copolymerizing ethylene and an alpha-olefinic comonomer comprising from 3 to 8 carbon atoms, in the presence of the chromium-based catalyst thereby to produce a second polyethylene copolymer at a temperature of 90° C. to 105° C., the first and second polyethylene copolymers forming a combined polyethylene copolymer having a monomodal molecular weight distribution wherein the HLMI of the second polyethylene copolymer is within ±15% of the HLMI of the first polyethylene copolymer and wherein a greater amount of comonomer is incorporated into the second polyethylene copolymer than in the first polyethylene copolymer.

12. A process according to claim 11 wherein the comonomer is 1-hexene.

13. A process according to claim 11 wherein the combined polyethylene comprises from 50 to 70% by weight of the first polyethylene product and from 30 to 50% by weight of the second polyethylene product.

14. A process according to claim 11 wherein the HLMI of the first and second polyethylene products is from 8 to 23 g/10 min.

15. A process according to claim 11 wherein the first and second polyethylene products have substantially the same density.

16. A process according to claim 15 wherein the second polyethylene product has a density within 0.001 g/cc of the density of the first polyethylene product.

17. A process according to claim 11 wherein the first and second polyethylene products differ in density by up to around 0.02 g/cc.

18. A process according to claim 11 wherein the density of the combined polyethylene is from 0.930 to 0.948 g/cc.

19. A process for producing polyethylene copolymer, the process consisting essentially of copolymerizing ethylene and an alpha-olefinic comonomer comprising from 3 to 8 carbon atoms, in the presence of a chromium-based catalyst in a first reactor at a temperature of 90° C. to 105° C., feeding the first polyethylene copolymer thereby produced and the chromium-based catalyst to a second reactor, and in the second reactor copolymerizing ethylene and an alpha-olefinic comonomer comprising from 3 to 8 carbon atoms, in the presence of the chromium-based catalyst thereby to produce a second polyethylene copolymer at a temperature of 90° C. to 105° C., the first and second polyethylene copolymers forming a combined polyethylene copolymer having a monomodal molecular weight distribution, an HLMI of from 8 to 23 g/10 min and a density of from 0.930 to 0.948 g/cc.

20. A process according to claim 19 wherein the combined polyethylene comprises from 50 to 70% by weight of the first polyethylene product and from 30 to 50% by weight of the second polyethylene product.

21. A process according to claim 1 wherein the temperature of the first reactor is different from the temperature of the second reactor in the range from 0.6 to 4° C.

22. A process according to claim 1 wherein the first polyethylene copolymer and the combined polyethylene copolymer have substantially the same HLMI.

23. A process according to claim 11 wherein the temperature of the first reactor is different from the temperature of the second reactor in the range from 0.6 to 4° C.

24. A process according to claim 11 wherein the first polyethylene copolymer and the combined polyethylene copolymer have substantially the same HLMI.

25. A process according to claim 19 wherein the temperature of the first reactor is different from the temperature of the second reactor in the range from 0.6 to 4° C.

26. A process according to claim 19 wherein the first polyethylene copolymer and the combined polyethylene copolymer have substantially the same HLMI.

* * * * *